(12) United States Patent
Nakamura et al.

(10) Patent No.: US 9,238,353 B2
(45) Date of Patent: Jan. 19, 2016

(54) INTERMEDIATE FILM FOR LAMINATED GLASS AND LAMINATED GLASS

(75) Inventors: Kozo Nakamura, Osaka (JP); Michio Shimamoto, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 134 days.

(21) Appl. No.: 12/988,859

(22) PCT Filed: Apr. 23, 2009

(86) PCT No.: PCT/JP2009/058106
§ 371 (c)(1),
(2), (4) Date: Dec. 2, 2010

(87) PCT Pub. No.: WO2009/131195
PCT Pub. Date: Oct. 29, 2009

(65) Prior Publication Data
US 2011/0070415 A1    Mar. 24, 2011

(30) Foreign Application Priority Data

Apr. 23, 2008  (JP) ................................. 2008-113173
Jul. 1, 2008    (JP) ................................. 2008-172231

(51) Int. Cl.
*C08K 5/103*    (2006.01)
*B32B 17/10*    (2006.01)

(52) U.S. Cl.
CPC ........... *B32B 17/10761* (2013.01); *C08K 5/103* (2013.01); *Y10T 428/24942* (2015.01)

(58) Field of Classification Search
None
See application file for complete search history.

(56) References Cited

U.S. PATENT DOCUMENTS

| 6,119,807 | A  | * | 9/2000  | Benson et al. ................ 181/208 |
| 6,720,082 | B1 | * | 4/2004  | Hashimoto et al. ........... 428/437 |
| 6,994,913 | B1 | * | 2/2006  | Niki et al. ..................... 428/480 |
| 2001/0046595 | A1 |   | 11/2001 | Moran et al. |
| 2003/0139520 | A1 | * | 7/2003  | Toyama et al. ............... 524/503 |

(Continued)

FOREIGN PATENT DOCUMENTS

| EP | 0 566 890 | 10/1993 |
| EP | 0 710 545 | 5/1996 |

(Continued)

OTHER PUBLICATIONS

JP0914344 A English Machine Translation (1994).*

(Continued)

*Primary Examiner* — Kenneth Stachel
(74) *Attorney, Agent, or Firm* — Wenderoth, Lind & Ponack, L.L.P.

(57) ABSTRACT

An interlayer film for a laminated glass provides excellent vibration damping performance at high temperature and excellent sound insulation in a wide temperature range. The interlayer film comprises a part A containing a resin composition A or a resin A and a part B containing a resin composition B or a resin B, and the part A and the part B are horizontally arranged. The interlayer film for a laminated glass has a difference between temperatures Ta and Tb of 10° C. or larger when the temperature Ta is a temperature at which the resin composition A or the resin A shows a maximum loss tangent of a dynamic viscoelasticity at a frequency of 1 Hz, and the temperature Tb is a temperature at which the resin composition B or the resin B shows a maximum loss tangent of a dynamic viscoelasticity at a frequency of 1 Hz.

7 Claims, 3 Drawing Sheets

(56) References Cited

U.S. PATENT DOCUMENTS

| | | | |
|---|---|---|---|
| 2006/0008658 A1 | 1/2006 | Fukatani et al. | |
| 2009/0022967 A1* | 1/2009 | Inenaga | 428/214 |

FOREIGN PATENT DOCUMENTS

| EP | 1 228 861 | | 8/2002 | |
| --- | --- | --- | --- | --- |
| EP | 1 281 690 | | 2/2003 | |
| JP | 5-310449 | | 11/1993 | |
| JP | 06039962 A | * | 2/1994 | ............. B32B 15/08 |
| JP | 09014344 A | * | 1/1997 | |
| JP | 2000272936 A | * | 10/2000 | |
| JP | 2001-064045 | | 3/2001 | |
| JP | 2003-252657 | | 9/2003 | |
| JP | 2005-206445 | | 8/2005 | |
| JP | 2005-213068 | | 8/2005 | |
| JP | 2008-133141 | | 6/2008 | |
| JP | 2008-168708 | | 7/2008 | |
| JP | 2008-230894 | | 10/2008 | |

OTHER PUBLICATIONS

JP 2000272936 A English Machine Translation (2000).*
JP06039962 English machine translation from JPO (1994).*
Definition of "Glass" from Hawley\'s Condensed Chemical Dictionary, 14th Edition Copyright © 2002 by John Wiley & Sons, Inc. (2002).*
International Search Report issued Jul. 21, 2009 in International (PCT) Application No. PCT/JP2009/058106.
Supplementary European Search Report issued Mar. 15, 2012 in EP Application No. 09735038.3.
Database WPI Week 200412, Thomson Scientific, London, GB; AN 2004-112727 XP002671029.

* cited by examiner (a)

(b)

(a)

(b)

(a)

(b)

(a)

(b)

US 9,238,353 B2

INTERMEDIATE FILM FOR LAMINATED GLASS AND LAMINATED GLASS

This application is a U.S. national stage of International Application No. PCT/JP2009/058106 filed Apr. 23, 2009.

TECHNICAL FIELD

The present invention relates to an interlayer film for a laminated glass which provides excellent vibration damping performance at high temperature and excellent sound insulation in a wide temperature range. The present invention also relates to a laminated glass incorporating the interlayer film for a laminated glass.

BACKGROUND ART

Laminated glasses are forms of safety glasses because few glass fragments are scattered even if they are broken into fragments by impact from the outside. The laminated glasses are widely used in windowpanes of, for example, motor vehicles such as automobiles, aircrafts, and buildings. Examples of the laminated glasses include laminated glasses having at least a pair of glasses integrated through an interlayer film for a laminated glass made of, for example, a polyvinyl acetal resin such as a polyvinyl butyral resin plasticized with a liquid plasticizer.

In recent years, entirely thin laminated glasses have been developed to achieve light weight and low cost. The disadvantages of these entirely thin laminated glasses are their low heat and sound insulation. Specifically, when these laminated glasses are used in, for example, windshields of vehicles, they problematically provide insufficient sound insulation against sounds around 2,000 to 5,000 Hz such as wind noise and sound of moving wiper, which have been conventionally cut out without difficulty.

In order to overcome these disadvantages, Patent Document 1 discloses an interlayer film for a sound insulating laminated glass having a sound insulation layer containing a large amount of a plasticizer sandwiched between covering layers containing a common amount of a plasticizer, as shown in FIG. 10. In this structure, the sound insulation layer provides high sound insulation, and the covering layers prevent the large amount of the plasticizer in the sound insulation layer from bleeding out. Therefore, the interlayer film for a sound insulating laminated glass provides high sound insulation as well as prevents the plasticizer from bleeding out.

However, laminated glasses incorporating the interlayer film for a sound insulating laminated glass disclosed in Patent Document 1 disadvantageously fail to sufficiently cut out sounds at specific wavelengths in a low temperature range and a high temperature range although they provide excellent sound insulation in a normal temperature range. For example, the service temperature of vehicles is as wide as −30 to 70° C. Interlayer films for a laminated glass which provide excellent sound insulation in a wide temperature range have been demanded.

The laminated glasses incorporating the interlayer film for a sound insulating laminated glass disclosed in Patent Document 1 have peaks of the loss factor in a normal temperature range and a high temperature range, which means that they provide excellent vibration damping performance. However, these laminated glasses may have an insufficient loss factor in a high temperature range. Sounds include airborne sounds such as noise of vehicles and alarm whistle, and structure-borne sounds such as sound produced by vibration of engines of vehicles. The disadvantage of these vibration damping laminated glasses is their insufficient vibration damping performance against structure-borne sounds in a high temperature range.

PRIOR ART DOCUMENT

Patent Document

Patent Document 1: Japanese Kokai Publication Hei-5-310449 (JP-A H05-310449)

SUMMARY OF THE INVENTION

Problems to be Solved by the Invention

An object of the present invention is to provide an interlayer film for a laminated glass which provides excellent damping performance at high temperature and excellent sound insulation in a wide temperature range. A further object of the present invention is to provide a laminated glass incorporating the interlayer film for a laminated glass.

Means for Solving the Problems

The present invention provides an interlayer film for a laminated glass, wherein the interlayer film for a laminated glass comprises a part A containing a resin composition A or a resin A and a part B containing a resin composition B or a resin B, the part A and the part B are horizontally arranged, and said interlayer film for a laminated glass has a difference between temperatures Ta and Tb of 10° C. or larger when the temperature Ta is a temperature at which the resin composition A or the resin A shows a maximum loss tangent of a dynamic viscoelasticity at a frequency of 1 Hz, and the temperature Tb is a temperature at which the resin composition B or the resin B shows a maximum loss tangent of a dynamic viscoelasticity at a frequency of 1 Hz.

Hereinafter, the present invention is described in detail.

The present inventors produced a laminated glass using the interlayer film for a laminated glass disclosed in Patent Document 1, and examined its sound insulation performance in detail. Specifically, an interlayer film for a laminated glass was prepared in which a sound insulation layer containing a large amount of a plasticizer was sandwiched by covering layers containing a common amount of a plasticizer, as shown in FIG. 10. Then, the interlayer film was sandwiched between two glass plates each having a thickness of 2 mm to give a laminated glass as shown in FIG. 10. This laminated glass was evaluated for its sound insulation performance. The obtained results revealed that the laminated glass had a tendency to transmit sounds around 3150 Hz at 0° C., and a tendency to transmit sounds around 6300 Hz at 40° C. The laminated glass, however, did not have a tendency to transmit a sound at a specific frequency at 23° C. This may be explained as follows.

All the covering layer/sound insulation layer/covering layer in the interlayer film for a laminated glass are in the glass state at 0° C. The two glass plates bonded with the interlayer film for a laminated glass in this state are integrated together and act together like a single glass plate having a thickness of 4 mm. The coincidence effect occurs in the quasi 4-mm-thickness glass plate, and thereby the laminated glass tends to transmit sounds around 3150 Hz.

The sound insulation layer in the interlayer film for a laminated glass is in the rubbery state at 40° C. The two glass plates bonded with the interlayer film for a laminated glass in this state independently act as the two 2-mm-thickness glass plates. The coincidence effect occurs in the 2-mm-thickness glass plates, and thereby the laminated glass tends to transmit sounds around 6300 Hz.

The sound insulation layer in the interlayer film for a laminated glass is in an intermediate state between the glass state and the rubbery state at 23° C. The two glass plates bonded with the interlayer film for a laminated glass in this state show intermediate performance between those of the single 4-mm-thickness glass plate and the two 2-mm-thickness glass plates, and thereby the laminated glass tends not to transmit sounds around 3150 Hz and sounds around 6300 Hz. Accordingly, the entire laminated glass provides high sound insulation.

Considering these results, the present inventors found that in order to achieve high sound insulation at a certain temperature, it is important to bond two glass plates with an interlayer film for a laminated glass having a resin layer that is in an intermediate state between the glass state and the rubbery state at the temperature.

In the interlayer film for a laminated glass having the structure of the covering layer/sound insulation layer/covering layer disclosed in Patent Document 1, the sound insulation layer first becomes the intermediate state between the glass state and the rubbery state with an increase in temperature among these layers, and thereby the interlayer film provides high sound insulation. Here, the covering layers are still in the glass state. Even when temperature rises to the transition temperature of the covering layer into the intermediate state between the glass state and the rubbery state, the laminated glass acts like two glass plates as the sound insulation layer is already in the rubbery state. The performance of the laminated glass depends on the sound insulation layer in the rubbery state although the covering layers are in the intermediate state between the glass state and the rubbery state. Namely, the sound insulation performance of the laminated glass through the interlayer film for a laminated glass having a plurality of layers laminated in the thickness direction depends on the layer whose transformation temperature from the glass state to the rubbery state is the lowest. The other layers are hardly likely to contribute to the sound insulation performance.

The present inventors also examined the reason why the laminated glass incorporating the interlayer film for a sound insulating laminated glass disclosed in Patent Document 1 provides low vibration damping performance against structure-borne sounds in a high temperature range. The reason may be explained as follows based on the results. In interlayer films for a laminated glass in which a comparatively soft sound insulation layer and comparatively hard covering layers are arranged in the thickness direction like the interlayer film for a laminated glass disclosed in Patent Document 1, a larger amount of the energy of structure-borne sounds is distributed in the comparatively soft sound insulation layer. Therefore, the sound insulation layer largely contributes to the vibration damping performance of the entire interlayer film for a laminated glass. On the other hand, a smaller amount of the energy of structure-borne sound is distributed in the comparatively hard covering layers, and thereby contribution of the covering layers to the vibration damping performance is extremely low. Accordingly, these interlayer films for a laminated glass provide low vibration damping performance against structure-borne sounds in a high temperature range.

The present inventors found out that an interlayer film for a laminated glass having a plurality of horizontally arranged parts each made of a resin composition having a different temperature at which the loss tangent of the dynamic viscoelasticity is maximum provides excellent sound insulation in a remarkably wide temperature range. This may be because each part provides high sound insulation in a temperature range in which the part is in the intermediate state between the glass state and the rubbery state. Each part tends to transmit a sound at a specific frequency in a temperature range other than the temperature range in which the part is in the intermediate state between the glass state and the rubbery state. Since any of the parts are in the intermediate state between the glass state and the rubbery state over a wide temperature range, the entire interlayer film for a laminated glass provides high sound insulation in the wide temperature range. In particular, it is possible to achieve high sound insulation over a remarkably wide temperature range by setting the difference in temperatures at which the loss tangents of the dynamic viscoelasticity of the respective parts are maximum sufficiently large.

In a structure in which a plurality of parts made of resin compositions each having a different temperature at which the loss tangent of the dynamic viscoelasticity is maximum are horizontally disposed, the energy of structure-borne sounds is distributed also to a part having a higher temperature at which the loss tangent of the dynamic viscoelasticity is maximum. Therefore, the layer provides sufficient vibration damping performance. With this structure, the interlayer film is allowed to provide sufficient vibration damping performance in high temperature.

The interlayer film for a laminated glass of the present invention comprises a part A containing a resin composition A or a resin A and a part B containing a resin composition B or a resin B, and the part A and the part B are horizontally arranged.

The expression "the part A and the part B are horizontally arranged" means, for example, a structure shown in FIG. 1 in which the part A and the part B are arranged parallel to each other in the horizontal direction.

The difference between temperatures Ta and Tb is 10° C. or larger. Here, Ta is defined as a temperature at which the loss tangent (hereinafter, also referred to as tan δ) of a dynamic viscoelasticity of the resin composition A or the resin A is maximum at a frequency of 1 Hz (hereinafter, also referred to as a tan δ peak temperature), and Tb is defined as a tan δ peak temperature of the resin composition B or the resin B. Tan δ can be measured according to JIS K 7244, specifically as follows: preparing a test sheet (diameter: 8 mm) with a resin composition; and determining the temperature dispersion of the dynamic viscoelasticity of the prepared test sheet by a shearing method under the conditions of a distortion amount of 1.0%, a frequency of 1 Hz, and a heating rate of 3° C./min.

The "tan δ peak temperature" means a temperature at which tan δ determined by the above-mentioned method is maximum. The tan δ peak temperature may be measured, for example, with a viscoelasticity measuring apparatus ("ARES" produced by Rheometrics).

The present inventors examined to reveal that the tan δ peak temperature varies with temperature and the frequency. As the measurement frequency becomes higher, the tan δ peak temperature shifts to the high temperature side. The coincidence frequency of glasses is in the range of about 2,000 to 8,000 Hz although it depends on the thickness. The coincidence frequency of a 4-mm-thickness glass is around 3150 Hz, and the tan δ peak temperature around 3150 Hz is determined by adding 18° C. to the tan δ peak temperature of the dynamic viscoelasticity measured at 1 Hz. Accordingly, the temperature range in which the resin composition is in the intermediate state between the glass state and the rubbery state is determined to be about (the tan δ peak temperature+18° C.)±10° C., and more likely to be (the tan δ peak temperature+18° C.)±10° C.

If the tan δ peak temperature of the resin composition A is, for example, 2° C., the part A is in the intermediate state between the glass state and the rubbery state in the temperature range of about 10 to 30° C. (20° C.±10° C.), and provides high sound insulation in this temperature range.

If the tan δ peak temperature of the resin composition B is, for example, 23° C., the part A is in the intermediate state between the glass state and the rubbery state in the temperature range of about 31 to 51° C. (41° C.±10° C.), and provides high sound insulation in this temperature range.

Namely, the interlayer film for a laminated glass of the present invention having the part A and the part B horizontally arranged provides high sound insulation in the temperature range of 10 to 51° C. if the tan δ peak temperature of the resin composition A in the part A and the tan δ peak temperature of the resin composition B in the part B are 2° C. and 23° C., respectively.

If the difference between the tan δ peak temperature Ta of the resin composition A or the resin A and the tan δ peak temperature Tb of the resin composition B or the resin B is less than 10° C., the temperature ranges supplied by the two parts largely overlap, and thereby it is impossible to achieve high sound insulation in a wide temperature range. The difference between the tan δ peak temperature Ta and the tan δ peak temperature Tb is preferably 15° C. or more. The lower limit of the difference between the tan δ peak temperature Ta and the tan δ peak temperature Tb is more preferably 20° C., and further more preferably 25° C. The upper limit of the difference between the tan δ peak temperature Ta and the tan δ peak temperature Tb is preferably 60° C., and more preferably 55° C.

If the difference between the tan δ peak temperature Ta and the tan δ peak temperature Tb is more than 20° C., there is a gap between the temperature ranges supplied by the two parts, and thereby it is impossible in theory to achieve high sound insulation in this gap temperature range. Actually, even if the difference between the tan δ peak temperature Ta and the tan δ peak temperature Tb is 20° C. or more, it is possible to achieve high sound insulation even in this gap temperature range.

Specifically, if Ta is lower than Tb and the difference between Ta and Tb is 20° C. or more, the part A is in the rubbery state and the part B is the glass state in the temperature range of Ta+28° C. to Tb+8° C. For example, in a laminated glass having two 2-mm-thickness glasses laminated, sounds around 3150 Hz are transmitted through the part B, and sounds around 6300 Hz are transmitted through the part A. However, sounds around 3150 Hz are not transmitted through the part A, and sounds around 6300 Hz are not transmitted through the part B. Therefore, the interlayer film for a laminated glass of the present invention provides higher sound insulation even in the temperature range of Ta+28° C. to Tb+8° C., compared to monolayer interlayer films made of the resin composition A or the resin A, monolayer interlayer films made of the resin composition B or the resin B, and interlayer films having a structure in which layers made of the resin composition A or the resin A and layers made of the resin composition B or the resin B are laminated.

The tan δ peak temperature Ta and the tan δ peak temperature Tb may be appropriately selected according to the intended use and the working conditions of a laminated glass to be produced. For example, when the laminated glass is used in a windshield for a vehicle, Ta and Tb are appropriately selected from the range of −38 to 42° C. as the working temperature range of the laminated glass is −30 to 70° C.

For example, for laminated glasses used in cold climates, Ta and Tb may be set in the range of −38 to −8° C. and the range of −28 to 2° C., respectively. With the tan δ peak temperature Ta and the tan δ peak temperature Tb in these ranges, it is possible to achieve high sound insulation in the temperature range of −30 to 30° C. For laminated glasses used in cold climates, Ta is preferably in the range of −38 to −18° C., and Tb is preferably in the range of −28 to −8° C.

For laminated glasses used in warm climates, Ta and Tb may be set in the range of 2 to 32° C. and the range of 12 to 42° C., respectively. With a tan δ peak temperature Ta and a tan δ peak temperature Tb set in these ranges, it is possible to achieve high sound insulation in the temperature range of 10 to 70° C. For laminated glasses used in warm climates, Ta is preferably in the range of 12 to 32° C., and Tb is preferably in the range of 22 to 42° C.

In order to achieve higher sound insulation performance in a wide temperature range, the interlayer film for a laminated glass of the present invention may further comprise a part C containing a resin composition C or a resin C. The part C is horizontally arranged in addition to the part A and the part B, and a tan δ peak temperature Tc of the resin composition C or the resin C is between the tan δ peak temperature Ta and the tan δ peak temperature Tb. For example, if Ta, Tc and Tb are set in the range of −28 to 2° C., the range of −18 to 12° C., and the range of −8 to 22° C., respectively, it is possible to achieve high sound insulation in the temperature range of −20 to 50° C., that is, it is possible to achieve high sound insulation in wide areas of from cold climates to warm climates. In addition, the part C contributes to vibration damping performance in a wide temperature range.

In order to achieve high sound insulation and vibration damping performance in a further wider temperature range, the interlayer film for a laminated glass of the present invention may comprise four or more horizontally arranged parts containing a resin composition having a different tan δ peak temperature.

The arrangement of the part A and the part B in the interlayer film for a laminated glass of the present invention is not particularly limited. Examples thereof include an arrangement in which the part A and the part B are horizontally arranged so that each occupies the half, as shown in FIG. 1, arrangements in which a plurality of the parts A and the parts B are horizontally arranged, as shown in FIGS. 2 and 3. Alternatively, the interface between the part A and the part B may be inclined to the horizontal, as shown in FIGS. 4 and 5.

FIGS. 6 and 7 show examples in which the interlayer film for a laminated glass of the present invention further comprises a part C.

The interlayer film for a laminated glass of the present invention preferably has the part A and the part B (and the part C) in the form of belts as it is easy to produce. If an interlayer film for a laminated glass having a structure in which the part A is located only at the passenger side and the part B is located only at the driver side is used, for example, for a windshield of a vehicle, one may not hear a sound with the left ear but hear it with the right ear. Considering the size (the distance between the right and left ears) of human head, the width of each belt is preferably 300 mm or less, and more preferably 200 mm or less.

The interlayer film for a laminated glass of the present invention may further comprise two covering layers D sandwiching any of the part A and the part B (and the part C), as shown in FIGS. 8 and 9. With the sandwiching covering layers, the interlayer film for a laminated glass of the present invention may be allowed to adhere with improved strength to a glass plate and provide improved penetration resistance. Especially, in a structure in which the covering layers D sandwich a part containing a large amount of a plasticizer, the covering layers prevent the plasticizer from bleeding out from the part.

The covering layer D contains a resin composition D or a resin D, and the resin composition D or the resin D preferably has the same or higher tan δ peak temperature than the highest tan δ peak temperature among those of the resin composition A, the resin composition B, and the resin composition C. The resin composition D or the resin D of the covering layer D may be the same resin composition or the same resin as that having the highest tan δ peak temperature among the resin composition A or the resin A, the resin composition B or the resin B, and the resin composition C or the resin C.

Preferable examples of the resin composition D and the resin D of the covering layer D include resin compositions containing 20 to 50 parts by weight of a plasticizer with respect to 100 parts by weight of a polyvinyl acetal resin having an acetal group containing 3 or 4 carbon atoms, an acetalization degree of 60 to 75 mol %, and an acetylation degree of 10 mol % or less. The more preferable lower limit of the plasticizer content of the resin composition D is 25 parts by weight, and the more preferable upper limit thereof is 45 parts by weight.

The area ratio of the part A and the part B in the interlayer film for a laminated glass of the present invention is not particularly limited.

Interlayer films for a laminated glass in the rubbery state transmit sounds at higher frequencies than in the glass state. For example, sounds around 3150 Hz are transmitted through a part in the glass state, and sounds around 6300 Hz are transmitted through a part in the rubbery state. Sounds at higher frequencies generally tend to be easily cut out. In order to achieve higher sound insulation in a wide temperature range, the area ratio of the part A and the part B is appropriately set so that sounds around 6300 Hz tend to be transmitted, and that sounds around 3150 Hz tend not to be transmitted. For example, if Ta is lower than Tb, the area ratio of the part A and the part B is preferably (9:1) to (4:6). At levels out of the preferable range, it may be impossible to achieve high sound insulation in a wide temperature range. With the part B in an area ratio of less than 10%, it may be impossible to achieve vibration damping performance under high temperature. The more preferable range of the area ratio of the part A and the part B is (8:2) to (6:4).

Portions in which the part A and the part B overlap in the thickness direction of the interlayer film for a laminated glass are regarded to be made of a resin composition having a lower tan δ peak temperature.

The thickness of the interlayer film for a laminated glass of the present invention is not particularly limited, but preferably has a lower limit of 300 μm and an upper limit of 2,000 μm. With a thickness of less than 300 μm, the interlayer film for a laminated glass of the present invention may provide insufficient penetration resistance. With a thickness of more than 2,000 μm, the interlayer film for a laminated glass of the present invention may be too thick to be used as an interlayer film for a laminated glass. The more preferable lower limit of the thickness of the interlayer film for a laminated glass of the present invention is 400 μm, and the more preferable upper limit thereof is 1,000 μm.

Resins in the resin compositions A and B, the resin A and the resin B are not particularly limited, but are preferably thermoplastic resins.

The thermoplastic resins are not particularly limited, and examples thereof include polyvinyl acetal resins, styrene-vinyl isoprene-styrene triblock copolymers, and ethylene-vinyl acetate copolymers. Among these, the styrene-vinyl isoprene-styrene triblock copolymers and polyvinyl acetal resins are preferable, and the polyvinyl acetal resins are more preferable. These resins may be used alone, or two or more of these may be used in combination.

The polyvinyl acetal resins can be produced by reacting a polyvinyl alcohol with an aldehyde.

The polyvinyl alcohol can be produced by saponifying polyvinyl acetate.

The saponification degree of the polyvinyl alcohol is preferably 80 to 99.8 mol %.

The preferable lower limit of the polymerization degree of the polyvinyl alcohol is 200, and the preferable upper limit thereof is 3,000. Use of a polyvinyl alcohol having a polymerization degree of less than 200 may deteriorate the penetration resistance of a laminated glass produced using the interlayer film for a laminated glass. Use of a polyvinyl alcohol having a polymerization degree of more than 3,000 may cause difficulty in producing the interlayer film for a laminated glass in a desired shape. The more preferable lower limit of the polymerization degree is 500, and the more preferable upper limit thereof is 2,000.

The resin composition A and the resin composition B preferably contain a plasticizer.

The plasticizer is not particularly limited, and examples thereof include: organic ester plasticizers such as monobasic organic acid esters and polybasic organic acid esters; and phosphate plasticizers such as organic phosphate plasticizers, and organic phosphite plasticizers.

The monobasic organic acid esters are not particularly limited, and examples thereof include glycol esters obtained by reacting a glycol such as triethylene glycol, tetraethylene glycol, or tripropylene glycol, and a monobasic organic acid such as butyric acid, isobutyric acid, caproic acid, 2-ethyl butyric acid, heptylic acid, n-octylic acid, 2-ethylhexylic acid, pelargonic acid (n-nonylic acid), or decylic acid.

The polybasic organic acid esters are not particularly limited, and examples thereof include ester compounds of a polybasic organic acid such as adipic acid, sebacic acid, or azelaic acid, and a linear or branched alcohol containing 4 to 8 carbon atoms.

The organic ester plasticizers are not particularly limited, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutylcarbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, triethylene glycol di-n-heptanoate, tetraethylene glycol di-n-heptanoate, triethylene glycol di-2-ethylbutyrate, triethylene glycol bis(2-ethylbutyrate), triethylene glycol di(2-ethylhexanoate), triethylene glycol diheptanoate, tetraethylene glycol diheptanoate, dihexyl adipate, dioctyl adipate, hexyl cyclohexyl adipate, diisononyl adipate, heptyl nonyl adipate, and dibutyl sebacate.

The organic phosphate plasticizers are not particularly limited, and examples thereof include tributoxyethyl phosphate, isodecyl phenyl phosphate, and triisopropyl phosphate.

Particularly preferable examples of the plasticizer include plasticizers containing at least one selected from the group consisting of dihexyl adipate (DHA), triethylene glycol di-2-ethylhexanoate (3GO), tetraethylene glycol di-2-ethylhexanoate (4GO), triethylene glycol di-2-ethylbutyrate (3 GH), tetraethylene glycol di-2-ethylbutyrate (4 GH), tetraethylene glycol diheptanoate (4G7), and triethylene glycol diheptanoate (3G7).

Triethylene glycol di-2-ethylhexanoate (3GO), triethylene glycol di-2-ethylbutyrate (3 GH), tetraethylene glycol di-2-ethylhexanoate (4GO), and dihexyl adipate (DHA) are preferable, and triethylene glycol di-2-ethylhexanoate (3GO) is more preferable since these plasticizers are less likely to be hydrolyzed.

The resin composition A and the resin composition B may contain additives such as a dispersing agent, an antioxidant, a light stabilizer, a flame retardant, an antistatic agent, an adhesion regulator, a moisture resistant agent, a heat reflecting agent, a heat absorbing agent, a fluorescent bleach, and a blue pigment.

Methods for setting the difference between the tan δ peak temperature Ta and the tan δ peak temperature Tb to be 10° C. or larger are not particularly limited, and examples thereof include (1) a method in which two different resins are chosen as the resins of the main components of the resin compositions A and B, the resin A and the resin B so that the difference in the tan δ peak temperature between the two resins is 10° C. or larger; and (2) a method in which the plasticizer contents of the resin composition A and the resin composition B are adjusted.

The method (1) in which two different resins are chosen as the resins of the main components of the resin compositions A and B, the resin A and the resin B so that the difference in the tan δ peak temperature between the two resins is 10° C. or larger is described in detail.

When the tan δ peak temperature is adjusted by the method (1), preferable examples of the resins include polyvinyl acetal resins, ethylene-vinyl acetate copolymers, and styrene-vinyl isoprene-styrene triblock copolymers. Among these, the styrene-vinyl isoprene-styrene triblock copolymers are preferable as the tan δ peak temperature of the styrene-vinyl isoprene-styrene triblock copolymers is easily adjusted, for example, by appropriately selecting monomer components thereof and setting the copolymerization ratio of the monomer components. Use of a resin mixture of two or more of the styrene-vinyl isoprene-styrene triblock copolymers each having a different tan δ peak temperature facilitates adjustment of its tan δ peak temperature by changing the blending ratio. The tan δ peak temperatures of the polyvinyl acetal resins are easily adjusted by controlling the acetylation degree and the acetalization degree thereof.

The method (2) in which the plasticizer contents of the resin composition A and the resin composition B are adjusted is described in detail.

Resin compositions containing a larger amount of a plasticizer generally have a lower tan δ peak temperature, and resin compositions containing a smaller amount of the plasticizer generally have a higher tan δ peak temperature. Therefore, the tan δ peak temperature Ta can be set higher than the tan δ peak temperature Tb, for example, by using a larger amount of the plasticizer in the resin composition A and a smaller amount of the plasticizer in the resin composition B.

When the tan δ peak temperature is adjusted by the method (2), preferable examples of the resins include polyvinyl acetal resins and vinyl chloride resins. Among these, the polyvinyl acetal resins are preferable. The tan δ peak temperatures of the polyvinyl acetal resins are easily adjusted by controlling the amount of the plasticizer to be added.

When the tan δ peak temperature Ta is set lower than the tan δ peak temperature Tb, preferable examples of the polyvinyl acetal resin contained in the resin composition A include, but not particularly limited to, polyvinyl acetal resins having an acetylation degree of 4 mol % or less obtained by acetalizing a polyvinyl alcohol with an aldehyde containing 3 to 4 carbon atoms, and preferable examples of the polyvinyl acetal resin contained in the resin composition B include, but not particularly limited to, polyvinyl acetal resins having an acetylation degree of 30 mol % or less obtained by acetalizing a polyvinyl alcohol with an aldehyde containing 3 to 6 carbon atoms.

Methods for producing the interlayer film for a laminated glass of the present invention are not particularly limited, and examples thereof include a method in which the resin composition A or the resin A, and the resin composition B or the resin B are co-extruded using an extrusion machine; and a method in which sheets made of the resin composition A or the resin A, and sheets made of the resin composition B or the resin B are respectively produced and then horizontally arranged.

A laminated glass having the interlayer film for a laminated glass of the present invention sandwiched between two transparent plates is also one aspect of the present invention.

The transparent plates used in the laminated glass of the present invention are not particularly limited, and may be commonly-used transparent plate glasses. Examples thereof include inorganic glasses such as float plate glasses, polished plate glasses, molded plate glasses, meshed plate glasses, wired plate glasses, colored plate glasses, heat ray absorbing glasses, heat reflecting glasses, and green glasses. Other examples include organic plastic plates such as polycarbonate plates and polyacrylate plates.

The plate glasses may be of two or more different types. The laminated glass of the present invention may be formed, for example, by sandwiching the interlayer film for a laminated glass of the present invention between a transparent float plate glass and a colored plate glass such as a green glass. Alternatively, the laminated glass of the present invention may be formed by sandwiching the interlayer film for a laminated glass of the present invention between the inorganic glass and the organic plastic plate.

The laminated glass of the present invention can be used as a glass in a vehicle such as a windshield, a side glass, a rear glass, a roof glass, and a panorama glass.

The laminated glass of the present invention may be produced by any method, and a conventionally known production method may be used.

Effects of the Invention

The present invention provides an interlayer film for a laminated glass which provides excellent vibration damping performance at high temperature and excellent sound insulation in a wide temperature range. The present invention also provides a laminated glass incorporating the interlayer film for a laminated glass.

MODES FOR CARRYING OUT THE INVENTION

Hereinafter, embodiments of the present invention are described in more detail by way of examples, but the present invention is not limited to these examples.

Example 1

(1) Preparation of Resin Composition A of Part A

An amount of 100 parts by weight of a polyvinyl butyral resin (PVB1) having an acetylation degree of 13 mol %, an acetal group containing 3 carbon atoms and a butyralization degree of 65 mol % was added with 60 parts by weight of a plasticizer of triethylene glycol-di-2-ethylhexanoate (3GO). The mixture was sufficiently kneaded with a mixing roll to provide a resin composition (resin composition A).

(2) Preparation of Resin Composition B of Part B

An amount of 100 parts by weight of a polyvinyl butyral resin (PVB2) having an acetylation degree of 1 mol %, an acetal group containing 3 carbon atoms and a butyralization degree of 68 mol % was added with 40 parts by weight of a plasticizer of triethylene glycol-di-2-ethylhexanoate (3GO). The mixture was sufficiently kneaded with a mixing roll to provide a resin composition (resin composition B).

(3) Production of Interlayer Film for Laminated Glass (for Sound Insulation Measurement)

The resin composition A was disposed between two release sheets each having a 0.8-mm clearance plate disposed thereon, and then press molded at 150° C. to provide a sheet (length: 500 mm, width: 250 mm, thickness: 0.8 mm) (sheet A).

The resin composition B was disposed between two release sheets each having a 0.8-mm clearance plate disposed thereon, and then press molded at 150° C. to provide a sheet (length: 500 mm, width: 125 mm, thickness: 0.8 mm) (sheet B).

Figure 1:
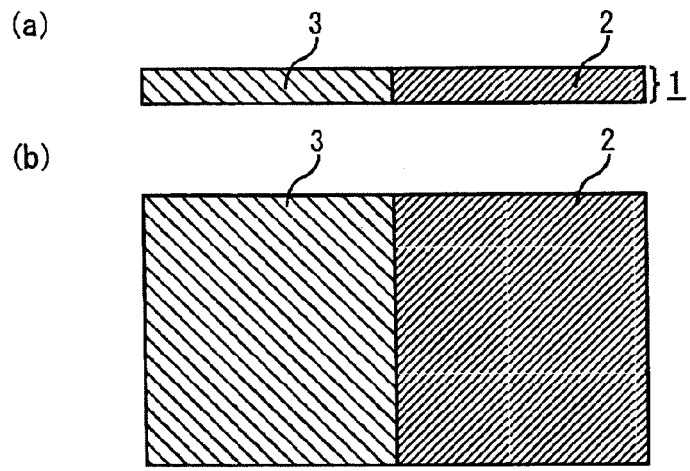
FIG. 1(a) is a cross-sectional view schematically illustrating one embodiment of the interlayer film for a laminated glass of the present invention.
FIG. 1(b) is a front view thereof.
Figure 2:
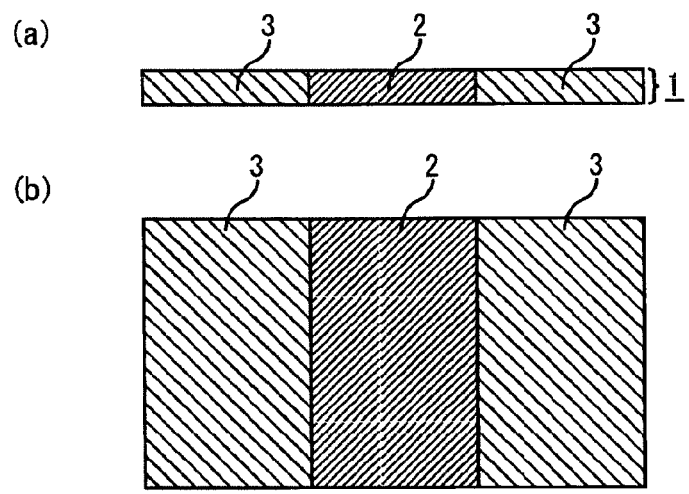
FIG. 2(a) is a cross-sectional view schematically illustrating one embodiment of the interlayer film for a laminated glass of the present invention.
FIG. 2(b) is a front view thereof.
Figure 3:
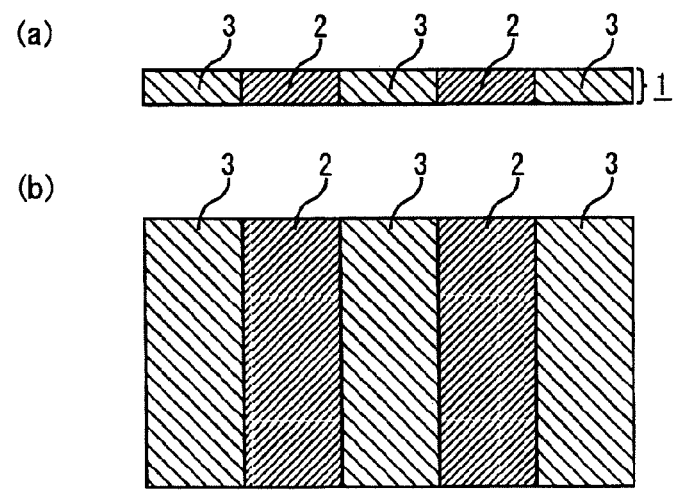
FIG. 3(a) is a cross-sectional view schematically illustrating one embodiment of the interlayer film for a laminated glass of the present invention.
FIG. 3(b) is a front view thereof.
Figure 4:
FIG. 4 is a cross-sectional view schematically illustrating one embodiment of the interlayer film for a laminated glass of the present invention.
Figure 5:
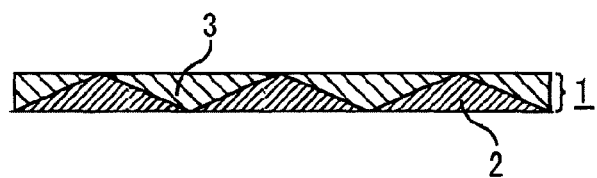
FIG. 5 is a cross-sectional view schematically illustrating one embodiment of the interlayer film for a laminated glass of the present invention.
Figure 6:
FIG. 6(a) is a cross-sectional view schematically illustrating one embodiment of the interlayer film for a laminated glass of the present invention.
FIG. 6(b) is a front view thereof.
Figure 6:
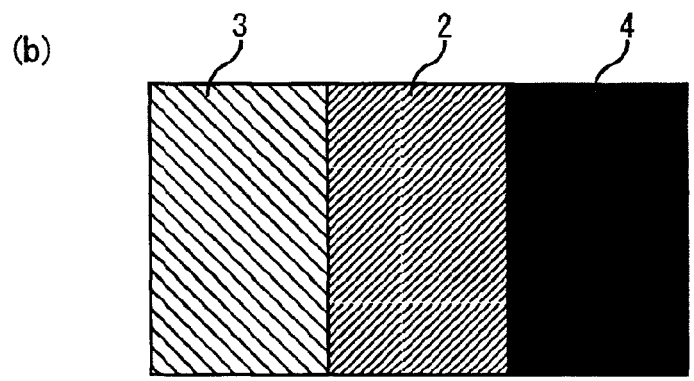
Figure 7:
FIG. 7(a) is a cross-sectional view schematically illustrating one embodiment of the interlayer film for a laminated glass of the present invention.
FIG. 7(b) is a front view thereof.
Figure 7:
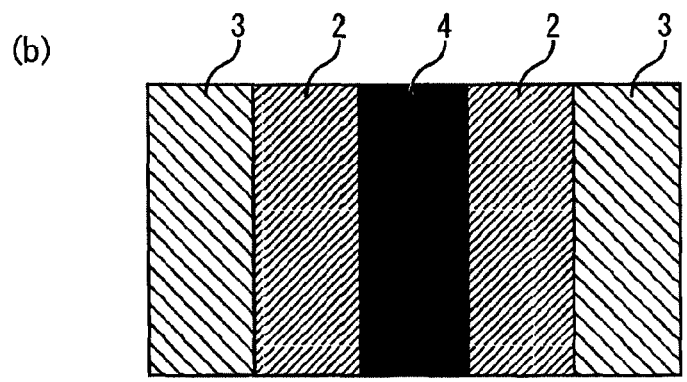

The sheet A and sheets B thus obtained were horizontally arranged in the order of B/A/B (area ratio 1:2:1) to provide an interlayer film for a laminated glass of the embodiment shown in FIG. 2 (length: 500 mm, width: 500 mm, thickness: 0.8 mm).

(4) Production of Interlayer Film for Laminated Glass (for Loss Factor Measurement)

The resin composition A was disposed between two release sheets each having a 0.8-mm clearance plate disposed thereon, and then press molded at 150° C. to provide a sheet (length: 305 mm, width: 15 mm, thickness: 0.8 mm) (sheet A).

The resin composition B was disposed between two release sheets each having a 0.8-mm clearance plate disposed thereon, and then press molded at 150° C. to provide a sheet (length: 305 mm, width: 7.5 mm, thickness: 0.8 mm) (sheet B).

The sheet A and sheets B thus obtained were horizontally arranged in the order of B/A/B (area ratio 1:2:1) to provide an interlayer film for a laminated glass of the embodiment shown in FIG. 2 (length: 305 mm, width: 30 mm, thickness: 0.8 mm).

Example 2

An interlayer film for a laminated glass was produced in the same manner as in Example 1, except that the plasticizer content of the resin composition A was changed to 30 parts by weight.

Example 3

An interlayer film for a laminated glass was produced in the same manner as in Example 1, except that a styrene-vinyl isoprene-styrene triblock copolymer (HYBRAR #7311, produced by Kuraray Co., Ltd.) (resin A) was used instead of the resin composition A.

Example 4

An interlayer film for a laminated glass was produced in the same manner as in Example 1, except that an acrylic resin (Nipol AR31, produced by Nippon Zeon Co., Ltd.) (resin A) was used instead of the resin composition A.

Example 5

An interlayer film for a laminated glass was produced in the same manner as in Example 1, except that an urethane resin (Elastollan C60D, produced by BASF) (resin A) was used instead of the resin composition A.

Example 6

An interlayer film for a laminated glass was produced in the same manner as in Example 1, except that an ethylene-vinyl acetate copolymer (EV170, produced by Du Pont-Mitsui Polychemicals Co., Ltd.) (resin A) was used instead of the resin composition A.

Example 7

An interlayer film for a laminated glass was produced in the same manner as in Example 1, except that the resin composition A was a mixture of a styrene-vinyl isoprene-styrene triblock copolymer (HYBRAR #5125, produced by Kuraray Co., Ltd.) and a styrene-vinyl isoprene-styrene triblock copolymer (HYBRAR #5127 produced by Kuraray Co., Ltd.) in a weight ratio of 1:1.

Example 8

An interlayer film for a laminated glass was produced in the same manner as in Example 1, except that the resin composition A was a mixture of the styrene-vinyl isoprene-styrene triblock copolymer (HYBRAR #5125, produced by Kuraray Co., Ltd.) and the styrene-vinyl isoprene-styrene triblock copolymer (HYBRAR #5127 produced by Kuraray Co., Ltd.) in a weight ratio of 3:1.

Example 9

(1) Preparation of Resin Composition A of Part A

The styrene-vinyl isoprene-styrene triblock copolymer (HYBRAR #7311, produced by Kuraray Co., Ltd.) was used as the resin A.

(2) Preparation of Resin Composition B of Part B

An amount of 100 parts by weight of a polyvinyl butyral resin (PVB2) having an acetylation degree of 1 mol %, an acetal group containing 3 carbon atoms and a butyralization degree of 68 mol % was added with 40 parts by weight of a plasticizer of triethylene glycol-di-2-ethylhexanoate (3GO). The mixture was sufficiently kneaded with a mixing roll to provide a resin composition (resin composition B).

(3) Preparation of Resin Composition C of Part C

An amount of 100 parts by weight of a polyvinyl butyral resin (PVB1) having an acetylation degree of 13 mol %, an acetal group containing 3 carbon atoms and a butyralization degree of 65 mol % was added with 60 parts by weight of a plasticizer of triethylene glycol-di-2-ethylhexanoate (3GO). The mixture was sufficiently kneaded with a mixing roll to provide a resin composition (resin composition C).

(4) Production of Interlayer Film for Laminated Glass (for Sound Insulation Measurement)

The resin A was disposed between two release sheets each having a 0.8-mm clearance plate disposed thereon, and then press molded at 150° C. to provide a sheet (length: 500 mm, width: 250 mm, thickness: 0.8 mm) (sheet A).
The resin composition B was disposed between two release sheets each having a 0.8-mm clearance plate disposed thereon, and then press molded at 150° C. to provide a sheet (length: 500 mm, width: 125 mm, thickness: 0.8 mm) (sheet B).
The resin composition C was disposed between two release sheets each having a 0.8-mm clearance plate disposed thereon, and then press molded at 150° C. to provide a sheet (length: 500 mm, width: 125 mm, thickness: 0.8 mm) (sheet C).
The sheet A, sheet B, and sheet C thus obtained were arranged in the order of B/A/C (area ratio 1:2:1) to provide an interlayer film for a laminated glass (length: 500 mm, width: 500 mm, thickness: 0.8 mm).

(5) Production of Interlayer Film for Laminated Glass (for Loss Factor Measurement)

The resin A was disposed between two release sheets each having a 0.8-mm clearance plate disposed thereon, and then press molded at 150° C. to provide a sheet (length: 305 mm, width: 15 mm, thickness: 0.8 mm) (sheet A).
The resin composition B was disposed between two release sheets each having a 0.8-mm clearance plate disposed thereon, and then press molded at 150° C. to provide a sheet (length: 305 mm, width: 7.5 mm, thickness: 0.8 mm) (sheet B).
The resin composition C was disposed between two release sheets each having a 0.8-mm clearance plate disposed thereon, and then press molded at 150° C. to provide a sheet (length: 305 mm, width: 7.5 mm, thickness: 0.8 mm) (sheet C).
The sheet A, sheet B, and sheet C thus obtained were arranged in the order of B/A/C (area ratio 1:2:1) to provide an interlayer film for a laminated glass (length: 305 mm, width: 30 mm, thickness: 0.8 mm).

Example 10

(1) Preparation of Resin Composition A of Part A

An amount of 100 parts by weight of a polyvinyl butyral resin (PVB1) having an acetylation degree of 13 mol %, an acetal group containing 3 carbon atoms and a butyralization degree of 65 mol % was added with 60 parts by weight of a plasticizer of triethylene glycol-di-2-ethylhexanoate (3GO). The mixture was sufficiently kneaded with a mixing roll to provide a resin composition (resin composition A).

(2) Preparation of Resin Composition B of Part B

An amount of 100 parts by weight of a polyvinyl butyral resin (PVB2) having an acetylation degree of 1 mol %, an acetal group containing 3 carbon atoms and a butyralization degree of 68 mol % was added with 40 parts by weight of a plasticizer of triethylene glycol-di-2-ethylhexanoate (3GO). The mixture was sufficiently kneaded with a mixing roll to provide a resin composition (resin composition B).

(3) Production of Interlayer Film for Laminated Glass (for Sound Insulation Measurement)

The resin composition A was disposed between two release sheets each having a 0.1-mm clearance plate disposed thereon, and then press molded at 150° C. to provide a sheet having a thickness of 0.1 mm (sheet A). The resin composition B was formed into a sheet having a thickness of 0.35 mm (sheet B) using 0.35-mm clearance plate under the same conditions.
The sheet A and sheets B thus obtained were laminated in the order of B/A/B to provide a laminated body. The obtained laminated body was disposed between two release sheets each having a 0.8-mm clearance plate disposed thereon, and then press molded at 150° C. to provide a sheet having a thickness of 0.8 mm (sheet X).

Next, the resin composition B was disposed between two release sheets each having a 0.8-mm clearance plate disposed thereon, and then press molded at 150° C. to provide a sheet having a thickness of 0.8 mm (sheet Y).

Figure 8:
FIG. 8(a) is a cross-sectional view schematically illustrating one embodiment of the interlayer film for a laminated glass of the present invention.
FIG. 8(b) is a front view thereof.
Figure 8:
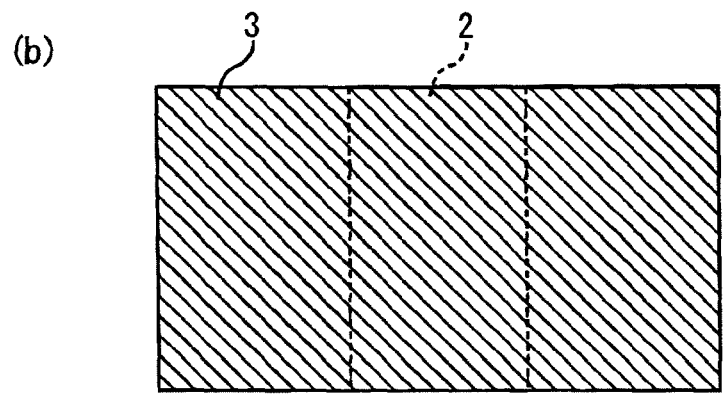

The sheet X (length: 500 mm, width: 250 mm, thickness: 0.8 mm) and sheet Y (length: 500 mm, width: 125 mm, thickness: 0.8 mm) thus obtained were horizontally arranged in the order of Y/X/Y in the form of belts to provide an interlayer film for a laminated glass (length: 500 mm, width: 500 mm, thickness: 0.8 mm) of the embodiment shown in FIG. 8.

(4) Production of Interlayer Film for Laminated Glass (for Loss Factor Measurement)

The resin composition A was disposed between two release sheets each having a 0.1-mm clearance plate disposed thereon, and then press molded at 150° C. to provide a sheet having a thickness of 0.1 mm (sheet A). The resin composition B was formed into a sheet having a thickness of 0.35 mm (sheet B) using 0.35-mm clearance plate under the same conditions.

The sheet A and sheets B thus obtained were laminated in the order of B/A/B to provide a laminated body. The obtained laminated body was disposed between two release sheets each having a 0.8-mm clearance plate disposed thereon, and then press molded at 150° C. to provide a sheet having a thickness of 0.8 mm (sheet X).

Next, the resin composition B was disposed between two release sheets each having a 0.8-mm clearance plate disposed thereon, and then press molded at 150° C. to provide a sheet having a thickness of 0.8 mm (sheet Y).

The sheet X (length: 305 mm, width: 15 mm, thickness: 0.8 mm) and sheets Y (length: 305 mm, width: 7.5 mm, thickness: 0.8 mm) were horizontally arranged in the order of Y/X/Y in the form of belts to provide an interlayer film for a laminated glass (length: 305 mm, width: 30 mm, thickness: 0.8 mm) of the embodiment shown in FIG. 8.

Example 11

An interlayer film for a laminated glass was produced in the same manner as in Example 10, except that the styrene-vinyl isoprene-styrene triblock copolymer (HYBRAR #7311, produced by Kuraray Co., Ltd.) (resin A) was used instead of the resin composition A.

Example 12

The sheet A, sheet B, and sheet C were arranged in the order of B/A/C (area ratio 1:2:1) in the same manner as in Example 9 to provide an interlayer film for a laminated glass (length: 500 mm, width: 500 mm, thickness: 0.8 mm).

The same resin composition B as that prepared in Example 9 was disposed between two release sheets each having a 0.2-mm clearance plate disposed thereon, and then press molded at 150° C. to provide a sheet (length: 500 mm, width: 500 mm, thickness: 0.2 mm) (sheet D).

Figure 9:
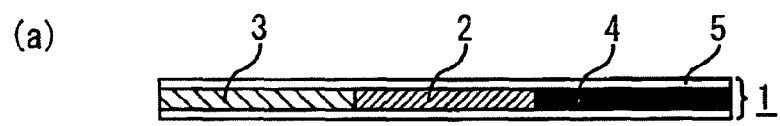
FIG. 9(a) is a cross-sectional view schematically illustrating one embodiment of the interlayer film for a laminated glass of the present invention.
FIG. 9(b) is a front view thereof.
Figure 9:
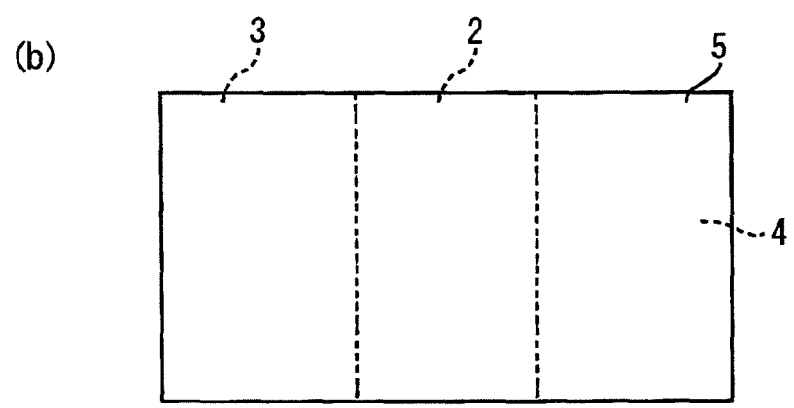

The obtained interlayer film for a laminated glass having the structure of B/A/C was sandwiched between two sheets D to provide an interlayer film for a laminated glass (length: 500 mm, width: 500 mm, thickness: 1.2 mm) of the embodiment shown in FIG. 9 for sound insulation measurement. Another sheet (length: 305 mm, width: 30 mm, thickness: 0.8 mm) formed by the sheet B, sheet A, and sheet C in a width of 7.5 mm, 15 mm, and 7.5 mm (ratio of 1:2:1), respectively, was produced and sandwiched between two sheets D (length: 305 mm, width: 30 mm, thickness: 0.2 mm) in the same manner to provide an interlayer film for a laminated glass used for loss factor measurement.

Example 13

An interlayer film for a laminated glass was produced in the same manner as in Example 1, except that the sheet A and sheets B were horizontally arranged in the order of B/A/B (area ratio 1:6:1).

Example 14

An interlayer film for a laminated glass was produced in the same manner as in Example 1 so that the ratio of the total area of the sheets A and the total area of the sheets B is 1:1, except that the sheets A and sheets B each had a width of 50 mm and were repeatedly and alternately arranged in the horizontal direction in the order of B/A/B/A . . . /A.

Example 15

An interlayer film for a laminated glass was produced in the same manner as in Example 1, except that the plasticizer content of the resin composition A was changed to 70 parts by weight, and that the plasticizer content of the resin composition B was changed to 20 parts by weight.

Example 16

An interlayer film for a laminated glass was produced in the same manner as in Example 1, except that the sheet A was prepared using a mixture of the styrene-vinyl isoprene-styrene triblock copolymer (HYBRAR #5125, produced by Kuraray Co., Ltd.) and the styrene-vinyl isoprene-styrene triblock copolymer (HYBRAR #5127, Kuraray Co., Ltd.) in a weight ratio of 3:7.

Example 17

An interlayer film for a laminated glass was produced in the same manner as in Example 1, except that the sheet A and sheets B were horizontally arranged in the order of B/A/B (area ratio 1:18:1).

Example 18

An interlayer film for a laminated glass was produced in the same manner as in Example 1, except that the sheet A and sheets B were horizontally arranged in the order of B/A/B (area ratio 3:4:3).

Example 19

An interlayer film for a laminated glass was produced in the same manner as in Example 12, except that the interlayer film for a laminated glass having the structure of B/A/B (area ratio 1:18:1) produced in Example 17 was used instead of the interlayer film for a laminated glass having the structure of B/A/C (area ratio 1:2:1) produced in Example 9.

Comparative Example 1

(1) Preparation of Resin Composition A of Layer A

An amount of 100 parts by weight of a polyvinyl butyral resin (PVB1) having an acetylation degree of 13 mol %, an acetal group containing 3 carbon atoms and a butyralization degree of 65 mol % was added with 60 parts by weight of a plasticizer of triethylene glycol-di-2-ethylhexanoate (3GO). The mixture was sufficiently kneaded with a mixing roll to provide a resin composition (resin composition A).

(2) Preparation of Resin Composition B of Layer B

An amount of 100 parts by weight of a polyvinyl butyral resin (PVB2) having an acetylation degree of 1 mol %, an acetal group containing 3 carbon atoms and a butyralization degree of 68 mol % was added with 40 parts by weight of a plasticizer of triethylene glycol-di-2-ethylhexanoate (3GO). The mixture was sufficiently kneaded with a mixing roll to provide a resin composition (resin composition B).

(3) Production of Interlayer Film for Laminated Glass

The resin composition A was disposed between two release sheets each having a 0.4-mm clearance plate disposed thereon, and then press molded at 150° C. to provide a sheet having a thickness of 0.4 mm (sheet A). The resin composition B was formed into a sheet having a thickness of 0.2 mm (sheet B) under the same conditions using 0.2-mm clearance plate.

Figure 10:
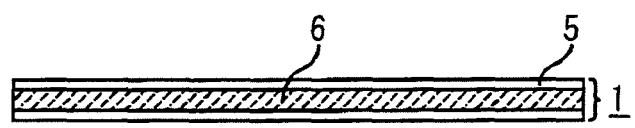
FIG. 10 is a cross-sectional view schematically illustrating a conventional interlayer film for a sound insulating laminated glass.

The sheet A and sheets B thus obtained were laminated in the order of B/A/B to provide a laminated body. The obtained laminated body was disposed between two release sheets each having a 0.8-mm clearance plate disposed thereon, and then press molded at 150° C. to provide an interlayer film for a laminated glass of the embodiment shown in FIG. 10 (thickness: 0.8 mm).

The obtained interlayer film for a laminated glass was cut into predetermined sizes to provide samples for sound insulation measurement and for loss factor measurement.

Comparative Example 2

An interlayer film for a laminated glass was produced in the same manner as in Comparative Example 1, except that the plasticizer content of the resin composition A was changed to 30 parts by weight.

Comparative Example 3

An interlayer film for a laminated glass was produced in the same manner as in Comparative Example 1, except that the styrene-vinyl isoprene-styrene triblock copolymer (HYBRAR #7311, produced by Kuraray Co., Ltd.) (resin A) was used instead of the resin composition A.

Comparative Example 4

An interlayer film for a laminated glass was produced in the same manner as in Comparative Example 1, except that the acrylic resin (Nipol AR31, produced by Nippon Zeon Co., Ltd.) (resin A) was used instead of the resin composition A.

Comparative Example 5

An interlayer film for a laminated glass was produced in the same manner as in Comparative Example 1, except that the urethane resin (Elastollan C60D, produced by BASF) (resin A) was used instead of the resin composition A.

Comparative Example 6

An interlayer film for a laminated glass was produced in the same manner as in Comparative Example 1, except that the ethylene-vinyl acetate copolymer (EV170, produced by Du Pont-Mitsui Polychemicals Co., Ltd.) (resin A) was used instead of the resin composition A.

Comparative Example 7

An interlayer film for a laminated glass was produced in the same manner as in Comparative Example 1, except that the resin composition A was a mixture of the styrene-vinyl isoprene-styrene triblock copolymer (HYBRAR #5125, produced by Kuraray Co., Ltd.) and the styrene-vinyl isoprene-styrene triblock copolymer (HYBRAR #5127, produced by Kuraray Co., Ltd.) in a weight ratio of 1:1.

Comparative Example 8

An interlayer film for a laminated glass was produced in the same manner as in Comparative Example 1, except that the resin composition A was a mixture of the styrene-vinyl isoprene-styrene triblock copolymer (HYBRAR #5125, produced by Kuraray Co., Ltd.) and the styrene-vinyl isoprene-styrene triblock copolymer (HYBRAR #5127 produced by Kuraray Co., Ltd.) in a weight ratio of 3:1.

Comparative Example 9

(1) Preparation of Resin A of Layer A

The styrene-vinyl isoprene-styrene triblock copolymer (HYBRAR #7311, produced by Kuraray Co., Ltd.) was used as the resin A.

(2) Preparation of Resin Composition B of Layer B

An amount of 100 parts by weight of a polyvinyl butyral resin (PVB2) having an acetylation degree of 1 mol %, an acetal group containing 3 carbon atoms and a butyralization degree of 68 mol % was added with 40 parts by weight of a plasticizer of triethylene glycol-di-2-ethylhexanoate (3GO). The mixture was sufficiently kneaded with a mixing roll to provide a resin composition (resin composition B).

(3) Preparation of Resin Composition C of Layer C

An amount of 100 parts by weight of a polyvinyl butyral resin (PVB1) having an acetylation degree of 13 mol %, an acetal group containing 3 carbon atoms and a butyralization degree of 65 mol % was added with 60 parts by weight of a plasticizer of triethylene glycol-di-2-ethylhexanoate (3GO). The mixture was sufficiently kneaded with a mixing roll to provide a resin composition (resin composition C).

(4) Production of Interlayer Film for Laminated Glass

The resin A was disposed between two release sheets each having a 0.4-mm clearance plate disposed thereon, and then press molded at 150° C. to provide a sheet having a thickness of 0.4 mm (sheet A). The resin composition B was formed into a sheet having a thickness of 0.2 mm (sheet B) using 0.2-mm clearance plate under the same conditions. The resin composition C was formed into a sheet having a thickness of 0.2 mm (sheet C) using 0.2-mm clearance plate under the same conditions.

The sheet A, sheet B, and sheet C thus obtained were laminated in the order of B/A/C to provide a laminated body. The obtained laminated body was disposed between two release sheets each having a 0.8-mm clearance plate disposed thereon, and then press molded at 150° C. to provide an interlayer film for a laminated glass (thickness: 0.8 mm) of the embodiment shown in FIG. 10.

Comparative Example 10

An interlayer film for a laminated glass was produced in the same manner as in Comparative Example 1, except that the thickness of the sheet A was changed to 50 μm, and that the thickness of the sheet B was changed to 375 μm.

Comparative Example 11

An interlayer film for a laminated glass was produced in the same manner as in Comparative Example 3, except that the thickness of the sheet A was changed to 50 μm, and that the thickness of the sheet B was changed to 375 μm.

Comparative Example 12

An interlayer film for a laminated glass was produced in the same manner as in Example 1, except that the resin composition B was a mixture of the styrene-vinyl isoprene-styrene triblock copolymer (HYBRAR #5125, produced by Kuraray Co., Ltd.) and the styrene-vinyl isoprene-styrene triblock copolymer (HYBRAR #5127 produced by Kuraray Co., Ltd.) in a weight ratio of 3:1.

(Evaluation)

The interlayer films for a laminated glass produced in Examples and Comparative Examples were evaluated as follows. Tables 1 to 7 show the results.

(1) Measurement of tan δ Peak Temperature of Resin Composition and Resin

Test sheets of the respective resin compositions and resins (diameter: 8 mm, thickness: 100 μm) were produced. The dynamic viscoelasticity of the test sheets was measured using a shearing method according to JIS K 7244 with a viscoelasticity measuring apparatus ("ARES" produced by Rheometrics) under the conditions of a distortion amount of 1.0% and a frequency of 1 Hz and a heating rate of 3° C./min to determine the temperature dispersion of the dynamic viscoelasticity and the tan δ peak temperature.

(2) Evaluation of Sound Insulation

Each of the obtained interlayer films for a laminated glass (for sound insulation measurement) was sandwiched between two transparent float glasses (500 mm×500 mm×2.0 mm), and held with a vacuum laminating machine for 30 minutes at 120° C. to be vacuum pressed. Thus, a laminated glass was produced.

The obtained laminated glass was measured for the airborne sound insulation performance (sound transmission loss) according to JIS A 1416. Based on the measured results, the laminated glass was determined as good or bad for each measurement temperature using the T-3 grade of the sound insulation grade according to JIS A 4706 as a benchmark.

The measurement was performed at six levels of 0 to 50° C. by 10° C. Samples that were determined as good at three or more levels were determined as good in the comprehensive evaluation, and samples that were determined as good at two or less levels were determined as bad in the comprehensive evaluation.

(3) Evaluation of Loss Factor

Each of the obtained interlayer films for a laminated glass (for loss factor measurement) was sandwiched between two transparent float glasses (305 mm×30 mm×2.0 mm), and held with a vacuum laminating machine for 30 minutes at 120° C. to be vacuum pressed. Thus, a laminated glass was produced. The obtained laminated glass was measured for the loss factor by a center excitation method according to JIS G 0602 with a measurement device "SA-01" (produced by RION Co., Ltd.) at temperatures of −10 to 60° C. by 5° C. The loss factor of the primary mode of the resonance frequency (around 100 Hz) among the obtained loss factors was used as an evaluation indicator. The resulting peak value on the highest temperature side was used for evaluation. The loss factor is commonly used as an indicator of vibration damping effects. The higher the loss factor is, the higher the vibration damping effect is.

TABLE 1

|  |  | Example 1 | Example 2 | Example 3 | Example 4 | Example 5 |
|---|---|---|---|---|---|---|
|  | Front view of interlayer film |  | 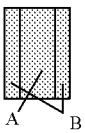 |  |  |  |
|  | Cross-sectional view of interlayer film |  | 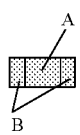 | 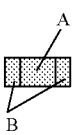 | 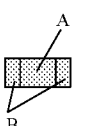 |  |
| Part A | Resin composition A or resin A | PVB1 (containing 60 parts by weight of plasticizer) | PVB1 (containing 30 parts by weight of plasticizer) | SIS (HYBRAR #7311) | Acrylic resin (Nipol AR31) | Urethane resin (Elastollan C60D) |
|  | Thickness (μm) | 800 | 800 | 800 | 800 | 800 |
|  | Tan δ peak temperature (° C.) | 2.8 | 17.1 | −18.7 | −4.1 | −10.2 |
| Part B | Resin composition B or resin B | PVB2 (containing 40 parts by weight of plasticizer) | PVB2 (containing 40 parts by weight of plasticizer) | PVB2 (containing 40 parts by weight of plasticizer) | PVB2 (containing 40 parts by weight of plasticizer) | PVB2 (containing 40 parts by weight of plasticizer) |
|  | Thickness (μm) | 800 | 800 | 800 | 800 | 800 |
|  | Tan δ peak temperature (° C.) | 30.5 | 30.5 | 30.5 | 30.5 | 30.5 |
| Part C | Resin composition C or resin C | — | — | — | — | — |
|  | Thickness (μm) | — | — | — | — | — |
|  | Tan δ peak temperature (° C.) | — | — | — | — | — |

TABLE 1-continued

|  |  | Example 1 | Example 2 | Example 3 | Example 4 | Example 5 |
|---|---|---|---|---|---|---|
| Covering layer D | Resin composition D or resin D | — | — | — | — | — |
|  | Thickness (μm) | — | — | — | — | — |
|  | Tan δ peak temperature (° C.) | — | — | — | — | — |
|  | Difference between Ta and Tb | 27.7 | 13.4 | 49.2 | 34.6 | 40.7 |
|  | Peak value of loss factor at high temperature side | 0.31 | 0.33 | 0.28 | 0.30 | 0.29 |
| Transmission loss | Transmission loss (0° C.) | Bad | Bad | Good | Bad | Good |
|  | Transmission loss (10° C.) | Bad | Bad | Good | Good | Good |
|  | Transmission loss (20° C.) | Good | Bad | Good | Good | Good |
|  | Transmission loss (30° C.) | Good | Good | Good | Good | Good |
|  | Transmission loss (40° C.) | Good | Good | Good | Good | Good |
|  | Transmission loss (50° C.) | Good | Good | Good | Good | Good |
|  | Number of good | 4 | 3 | 6 | 5 | 6 |
|  | Comprehensive evaluation | Good | Good | Good | Good | Good |

TABLE 2

|  |  | Example 6 | Example 7 | Example 8 | Example 9 | Example 10 |
|---|---|---|---|---|---|---|
| Front view of interlayer film |  | A B | A B | A B | B A C | B |
| Cross-sectional view of interlayer film |  | A / B | A / B | A / B | A / B C | A / B |
| Part A | Resin composition A or resin A | EVA (EV170) | SIS (mixture of HYBRAR #5125 and HYBRAR #5127) | SIS (mixture of HYBRAR #5125 and HYBRAR #5127) | SIS (HYBRAR #7311) | PVB1 (containing 60 parts by weight of plasticizer) |
|  | Thickness (μm) | 800 | 800 | 800 | 800 | 800 |
|  | Tan δ peak temperature (° C.) | −22.0 | 14.8 | 8.9 | −18.7 | 2.8 |
| Part B | Resin composition B or resin B | PVB2 (containing 40 parts by weight of plasticizer) | PVB2 (containing 40 parts by weight of plasticizer) | PVB2 (containing 40 parts by weight of plasticizer) | PVB2 (containing 40 parts by weight of plasticizer) | PVB2 (containing 40 parts by weight of plasticizer) |
|  | Thickness (μm) | 800 | 800 | 800 | 800 | 800 |
|  | Tan δ peak temperature (° C.) | 30.5 | 30.5 | 30.5 | 30.5 | 30.5 |
| Part C | Resin composition C or resin C | — | — | — | PVB1 (containing 60 parts by weight of plasticizer) | — |
|  | Thickness (μm) | — | — | — | 800 | — |
|  | Tan δ peak temperature (° C.) | — | — | — | 2.8 | — |
| Covering layer D | Resin composition D or resin D | — | — | — | — | — |
|  | Thickness (μm) | — | — | — | — | — |
|  | Tan δ peak temperature (° C.) | — | — | — | — | — |
|  | Difference between Ta and Tb | 52.5 | 15.7 | 21.8 | 49.2 | 27.7 |
|  | Peak value of loss factor at high temperature side | 0.27 | 0.33 | 0.32 | 0.16 | 0.22 |
| Transmission loss | Transmission loss (0° C.) | Good | Bad | Bad | Good | Bad |
|  | Transmission loss (10° C.) | Good | Bad | Bad | Good | Bad |
|  | Transmission loss (20° C.) | Good | Bad | Good | Good | Good |
|  | Transmission loss (30° C.) | Good | Good | Good | Good | Good |
|  | Transmission loss (40° C.) | Good | Good | Good | Good | Good |
|  | Transmission loss (50° C.) | Good | Good | Good | Good | Good |
|  | Number of good | 6 | 3 | 4 | 6 | 4 |
|  | Comprehensive evaluation | Good | Good | Good | Good | Good |

TABLE 3

|  | Example 11 | Example 12 | Example 13 | Example 14 | Example 15 |
|---|---|---|---|---|---|
| Front view of interlayer film | B | B | A B | A B | A B |

TABLE 3-continued

|  |  | Example 11 | Example 12 | Example 13 | Example 14 | Example 15 |
|---|---|---|---|---|---|---|
| Cross-sectional view of interlayer film | | | | | | |
| Part A | Resin composition A or resin A | SIS (HYBRAR #7311) | SIS (HYBRAR #7311) | PVB1 (containing 60 parts by weight of plasticizer) | PVB1 (containing 60 parts by weight of plasticizer) | PVB1 (containing 70 parts by weight of plasticizer) |
| | Thickness (μm) | 800 | 1200 | 800 | 800 | 800 |
| | Tan δ peak temperature (° C.) | −18.7 | −18.7 | 2.8 | 2.8 | −2.5 |
| Part B | Resin composition B or resin B | PVB2 (containing 40 parts by weight of plasticizer) | PVB2 (containing 40 parts by weight of plasticizer) | PVB2 (containing 40 parts by weight of plasticizer) | PVB2 (containing 40 parts by weight of plasticizer) | PVB2 (containing 20 parts by weight of plasticizer) |
| | Thickness (μm) | 800 | 1200 | 800 | 800 | 800 |
| | Tan δ peak temperature (° C.) | 30.5 | 30.5 | 30.5 | 30.5 | 39.8 |
| Part C | Resin composition C or resin C | — | PVB1 (containing 60 parts by weight of plasticizer) | — | — | — |
| | Thickness (μm) | — | 1200 | — | — | — |
| | Tan δ peak temperature (° C.) | — | 2.8 | — | — | — |
| Covering layer D | Resin composition D or resin D | — | PVB2 (containing 40 parts by weight of plasticizer) | — | — | — |
| | Thickness (μm) | — | 200 | — | — | — |
| | Tan δ peak temperature (° C.) | — | 30.5 | — | — | — |
| Difference between Ta and Tb | | 49.2 | 49.2 | 27.7 | 27.7 | 42.3 |
| Peak value of loss factor at high temperature side | | 0.18 | 0.22 | 0.27 | 0.35 | 0.31 |
| Transmission loss | Transmission loss (0° C.) | Good | Good | Bad | Bad | Bad |
| | Transmission loss (10° C.) | Good | Good | Bad | Bad | Good |
| | Transmission loss (20° C.) | Good | Good | Good | Good | Good |
| | Transmission loss (30° C.) | Good | Good | Good | Good | Good |
| | Transmission loss (40° C.) | Good | Good | Good | Good | Good |
| | Transmission loss (50° C.) | Good | Good | Bad | Good | Good |
| | Number of good | 6 | 8 | 3 | 4 | 5 |
| | Comprehensive evaluation | Good | Good | Good | Good | Good |

TABLE 4

|  |  | Example 16 | Example 17 | Example 18 | Example 19 |
|---|---|---|---|---|---|
| Front view of interlayer film | | | | | |
| Cross-sectional view of interlayer film | | | | | |
| Part A | Resin composition A or resin A | SIS (mixture of HYBRAR #5125 and HYBRAR #5127) | PVB1 (containing 60 parts by weight of plasticizer) | PVB1 (containing 60 parts by weight of plasticizer) | PVB1 (containing 60 parts by weight of plasticizer) |
| | Thickness (μm) | 800 | 800 | 800 | 1200 |
| | Tan δ peak temperature (° C.) | 19.5 | 2.8 | 2.8 | 2.8 |
| Part B | Resin composition B or resin B | PVB2 (containing 40 parts by weight of plasticizer) | PVB2 (containing 40 parts by weight of plasticizer) | PVB2 (containing 40 parts by weight of plasticizer) | PVB2 (containing 40 parts by weight of plasticizer) |
| | Thickness (μm) | 800 | 800 | 800 | 1200 |
| | Tan δ peak temperature (° C.) | 30.5 | 30.5 | 30.5 | 30.5 |
| Part C | Resin composition C or resin C | — | — | — | — |
| | Thickness (μm) | — | — | — | — |
| | Tan δ peak temperature (° C.) | — | — | — | — |
| Covering layer D | Resin composition D or resin D | — | — | — | PVB2 (containing 40 parts by weight of plasticizer) |

TABLE 4-continued

|  | Example 16 | Example 17 | Example 18 | Example 19 |
|---|---|---|---|---|
| Thickness (μm) | — | — | — | 200 |
| Tan δ peak temperature (° C.) | — | — | — | 30.5 |
| Difference between Ta and Tb | 11 | 27.7 | 27.7 | 27.7 |
| Peak value of loss factor at high temperature side | 0.35 | 0.19 | 0.32 | 0.20 |
| Transmission loss  Transmission loss (0° C.) | Bad | Bad | Bad | Bad |
| Transmission loss (10° C.) | Bad | Bad | Bad | Bad |
| Transmission loss (20° C.) | Bad | Good | Bad | Good |
| Transmission loss (30° C.) | Good | Good | Good | Good |
| Transmission loss (40° C.) | Good | Good | Good | Good |
| Transmission loss (50° C.) | Good | Bad | Good | Bad |
| Number of good | 3 | 3 | 3 | 3 |
| Comprehensive evaluation | Good | Good | Good | Good |

TABLE 5

|  |  | Comparative Example 1 | Comparative Example 2 | Comparative Example 3 | Comparative Example 4 | Comparative Example 5 |
|---|---|---|---|---|---|---|
| Layer A | Resin composition A or resin A | PVB1 (containing 60 parts by weight of plasticizer) | PVB1 (containing 30 parts by weight of plasticizer) | SIS (HYBRAR #7311) | Acrylic resin (Nipol AR31) | Urethane resin (Elastollan C60D) |
|  | Thickness (μm) | 400 | 400 | 400 | 400 | 400 |
|  | Tan δ peak temperature (° C.) | 2.8 | 17.1 | −18.7 | −4.1 | −10.2 |
| Layer B | Resin composition B or resin B | PVB2 (containing 40 parts by weight of plasticizer) | PVB2 (containing 40 parts by weight of plasticizer) | PVB2 (containing 40 parts by weight of plasticizer) | PVB2 (containing 40 parts by weight of plasticizer) | PVB2 (containing 40 parts by weight of plasticizer) |
|  | Thickness (μm) | 200 | 200 | 200 | 200 | 200 |
|  | Tan δ peak temperature (° C.) | 30.5 | 30.5 | 30.5 | 30.5 | 30.5 |
| Layer C | Resin composition C or resin C | — | — | — | — | — |
|  | Thickness (μm) | — | — | — | — | — |
|  | Tan δ peak temperature (° C.) | — | — | — | — | — |
| Covering layer D | Resin composition D or resin D | — | — | — | — | — |
|  | Thickness (μm) | — | — | — | — | — |
|  | Tan δ peak temperature (° C.) | — | — | — | — | — |
| Difference between Ta and Tb |  | 27.7 | 13.4 | 49.2 | 34.6 | 40.7 |
| Peak value of loss factor at high temperature side |  | 0.17 | 0.22 | 0.11 | 0.14 | 0.13 |
| Transmission loss  Transmission loss (0° C.) |  | Bad | Bad | Good | Bad | Bad |
| Transmission loss (10° C.) |  | Bad | Bad | Good | Bad | Good |
| Transmission loss (20° C.) |  | Good | Bad | Bad | Good | Good |
| Transmission loss (30° C.) |  | Good | Bad | Bad | Good | Bad |
| Transmission loss (40° C.) |  | Bad | Good | Bad | Bad | Bad |
| Transmission loss (50° C.) |  | Bad | Good | Bad | Bad | Bad |
| Number of good |  | 2 | 2 | 2 | 2 | 2 |
| Comprehensive evaluation |  | Bad | Bad | Bad | Bad | Bad |

TABLE 6

|  | Comparative Example 6 | Comparative Example 7 | Comparative Example 8 | Comparative Example 9 | Comparative Example 10 |
|---|---|---|---|---|---|

TABLE 6-continued

| | | Comparative Example 6 | Comparative Example 7 | Comparative Example 8 | Comparative Example 9 | Comparative Example 10 |
|---|---|---|---|---|---|---|
| | Cross-sectional view of interlayer film |  |  |  |  |  |
| Layer A | Resin composition A or resin A | EVA (EV170) | SIS (mixture of HYBRAR #5125 and HYBRAR #5127) | SIS (mixture of HYBRAR #5125 and HYBRAR #5127) | SIS (HYBRAR #7311) | PVB1 (containing 60 parts by weight of plasticizer) |
| | Thickness (μm) | 400 | 400 | 400 | 400 | 50 |
| | Tan δ peak temperature (° C.) | −22.0 | 14.8 | 8.9 | −18.7 | 2.8 |
| Layer B | Resin composition B or resin B | PVB2 (containing 40 parts by weight of plasticizer) | PVB2 (containing 40 parts by weight of plasticizer) | PVB2 (containing 40 parts by weight of plasticizer) | PVB2 (containing 40 parts by weight of plasticizer) | PVB2 (containing 40 parts by weight of plasticizer) |
| | Thickness (μm) | 200 | 200 | 200 | 200 | 375 |
| | Tan δ peak temperature (° C.) | 30.5 | 30.5 | 30.5 | 30.5 | 30.5 |
| Layer C | Resin composition C or resin C | — | — | — | PVB1 (containing 60 parts by weight of plasticizer) | — |
| | Thickness (μm) | — | — | — | 200 | — |
| | Tan δ peak temperature (° C.) | — | — | — | 2.8 | — |
| Covering layer D | Resin composition D or resin D | — | — | — | — | — |
| | Thickness (μm) | — | — | — | — | — |
| | Tan δ peak temperature (° C.) | — | — | — | — | — |
| | Difference between Ta and Tb | 52.5 | 15.7 | 21.6 | 49.2 | 27.7 |
| | Peak value of loss factor at high temperature side | 0.10 | 0.19 | 0.17 | 0.06 | 0.20 |
| Transmission loss | Transmission loss (0° C.) | Good | Bad | Bad | Good | Bad |
| | Transmission loss (10° C.) | Good | Bad | Bad | Good | Bad |
| | Transmission loss (20° C.) | Bad | Bad | Good | Bad | Good |
| | Transmission loss (30° C.) | Bad | Good | Good | Bad | Good |
| | Transmission loss (40° C.) | Bad | Good | Good | Bad | Bad |
| | Transmission loss (50° C.) | Bad | Bad | Bad | Bad | Bad |
| | Number of good | 2 | 2 | 2 | 2 | 2 |
| | Comprehensive evaluation | Bad | Bad | Bad | Bad | Bad |

TABLE 7

| | | Comparative Example 11 | Comparative Example 12 |
|---|---|---|---|
| | Front view of interlayer film | 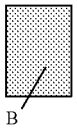 |  |
| | Cross-sectional view of interlayer film | 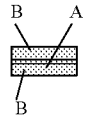 |  |
| Layer A (Part A) | Resin composition A or resin A | SIS (HYBRAR #7311) | PVB1 (containing 60 parts by weight of plasticizer) |
| | Thickness (μm) | 50 | 800 |
| | Tan δ peak temperature (° C.) | −18.7 | 2.8 |
| Layer B (Part B) | Resin composition B or resin B | PVB2 (containing 40 parts by weight of plasticizer) | SIS (mixture of HYBRAR #5125 and HYBRAR #5127) |
| | Thickness (μm) | 350 | 800 |
| | Tan δ peak temperature (° C.) | 30.5 | 8.9 |
| Layer C | Resin composition C or resin C | — | — |
| | Thickness (μm) | — | — |
| | Tan δ peak temperature (° C.) | — | — |
| Covering layer D | Resin composition D or resin D | — | — |
| | Thickness (μm) | — | — |
| | Tan δ peak temperature (° C.) | — | — |
| | Difference between Ta and Tb | 49.2 | 6.1 |
| | Peak value of loss factor at high temperature side | 0.14 | 0.29 |
| Transmission loss | Transmission loss (0° C.) | Good | Bad |

TABLE 7-continued

|  | Comparative Example 11 | Comparative Example 12 |
|---|---|---|
| Transmission loss (10° C.) | Good | Bad |
| Transmission loss (20° C.) | Bad | Good |
| Transmission loss (30° C.) | Bad | Good |
| Transmission loss (40° C.) | Bad | Bad |
| Transmission loss (50° C.) | Bad | Bad |
| Number of good | 2 | 2 |
| Comprehensive evaluation | Bad | Bad |

INDUSTRIAL APPLICABILITY

The present invention provides an interlayer film for a laminated glass which provides excellent vibration damping performance at high temperature and excellent sound insulation in a wide temperature range. The present invention also provides a laminated glass incorporating the interlayer film for a laminated glass.

EXPLANATION OF SYMBOLS

1 Interlayer film for laminated glass
2 Part A
3 Part B
4 Part C
5 Covering Layer D
6 Sound insulation layer

The invention claimed is:

1. An interlayer film for a laminated glass, comprising:
an interlayer film,
wherein said interlayer film for a laminated glass comprises a film part A containing a resin composition A or a resin A, and a film part B containing a resin composition B or a resin B, and two covering layer Ds containing the same resin composition B or the same resin B,
wherein the resin composition A contains polyvinyl acetal resin and/or the resin A is polyvinyl acetal resin,
wherein the resin composition B contains polyvinyl acetal resin and/or the resin B is polyvinyl acetal resin,
wherein the film part A has an upper planar surface, a lower planar surface, and a plurality of side surfaces defining a first portion of the interlayer film, the film part B has an upper planar surface, a lower planar surface, and a plurality of side surfaces defining a second portion of the interlayer film, and the two covering layer Ds have an upper planar surface, a lower planar surface, and a plurality of side surfaces defining a third and fourth portion of the interlayer film,
wherein the resin composition A or the resin A has a temperature Ta at which the resin composition A or the resin A shows a maximum loss tangent of a dynamic viscoelasticity at a frequency of 1 Hz,
wherein the resin composition B or the resin B has a temperature Tb at which the resin composition B or the resin B shows a maximum loss tangent of a dynamic viscoelasticity at a frequency of 1 Hz,
wherein the temperature Tb is larger than the temperature Ta by 10° C. or more,
wherein the film part A and the film part B are horizontally arranged, such that the upper planar surface of the film part A and the upper planar surface of the film part B are horizontally arranged in a same horizontal plane, and the lower planar surface of the film part A and the lower planar surface of the film part B are horizontally arranged in a same horizontal plane, and
wherein the film part A and the film part B are sandwiched between the two covering layer Ds such that one of the third or fourth portions is above the film part A and film part B and the other of the third or fourth portions is below the film part A and film part B.

2. The interlayer film for a laminated glass according to claim 1, wherein the temperature Ta and the temperature Tb each are in the range of −38 to 42° C.

3. The interlayer film for a laminated glass according to claim 1, wherein a ratio of an area of the film part A and an area of the film part B is (9:1) to (4:6).

4. The interlayer film for a laminated glass according to claim 1,
wherein the film part A and the film part B are horizontally arranged in the form of belts, and
each of the belts has a width of 300 mm or less.

5. The interlayer film for a laminated glass according to claim 1, further comprising a film part C,
wherein the film part C contains a resin composition C or a resin C which is horizontally arranged with the film part A and the film part B in the same horizontal planes as film parts A and B, and
wherein the resin composition C or the resin C has a temperature Tc at which a loss tangent of a dynamic viscoelasticity of the resin composition C or the resin C at a frequency of 1 Hz is maximum is between the temperature Ta and the temperature Tb.

6. The interlayer film for a laminated glass according to claim 1,
wherein the covering layer Ds comprise a resin composition containing 20 to 50 parts by weight of a plasticizer with respect to 100 parts by weight of a polyvinyl acetal resin having an acetal group containing 3 or 4 carbon atoms, an acetalization degree of 60 to 75 mol %, and an acetylation degree of 30 mol % or less.

7. A laminated article, comprising:
a first transparent plate and a second transparent plate,
wherein the interlayer film for a laminated glass according to claim 1 is sandwiched between said first and second transparent plates, one above the covering layer Ds' third or fourth portion and one below the other covering layer Ds' third or fourth portion.

* * * * *